UNITED STATES PATENT OFFICE.

JONAS W. AYLSWORTH, OF EAST ORANGE, NEW JERSEY, ASSIGNOR, BY DIRECT AND MESNE ASSIGNMENTS, TO THE HALOGEN PRODUCTS COMPANY, OF WEST ORANGE, NEW JERSEY, A CORPORATION OF NEW JERSEY.

ELECTRICAL INSULATOR.

1,094,829.     Specification of Letters Patent.     Patented Apr. 28, 1914.

No Drawing.     Application filed March 17, 1911. Serial No. 615,040½.

*To all whom it may concern:*

Be it known that I, JONAS W. AYLSWORTH, a citizen of the United States, and a resident of East Orange, in the county of Essex and State of New Jersey, have invented certain new and useful Improvements in Electrical Insulators, of which the following is a description.

My invention relates to liquid insulators into which electrical apparatus, such as transformer coils, are submerged, and the object of my invention is to provide a fluid insulation for the purpose possessing highly desirable qualities that are not possessed by the oils now in use for this purpose.

A liquid insulator for effectively insulating a transformer coil or other electrical apparatus immersed in the liquid should possess certain properties for obtaining the best results in actual practice. The liquid should be highly dielectric, so as to resist the tendency of the current to leak or discharge from its conductor; it should possess great fluidity, so as to enter and fill in cracks or fissures that may be formed in the insulating material and which unless filled are the cause of incipient leakage of current followed by eventual breaking down of the insulation; it should be non-hygroscopic, thereby resisting any tendency to absorb water, the presence of which is obviously detrimental to the insulating properties of the liquid. It should have a high specific gravity, so that if any water enters the container in which the fluid is held it will float on the surface thereof, instead of entering the liquid or accumulating at the bottom to form an objectionable conducting layer; it should possess a low freezing point, so as to remain liquid at low temperatures; it should possess a high specific heating point and be able to rapidly dissipate heat, so as not to be affected by high temperatures and in case heat is developed by current leakage it will be rapidly dissipated; it should have a high boiling point, so that in case the liquid is heated it will not be volatilized or changed in character; at all times it should be chemically inert and stable. I have discovered a substance which possesses these desirable properties in a high degree and which may be cheaply produced. This liquid is the isomer of mono-chloro-naphthalene, which is produced by the chlorination of molten naphthalene under pressure at temperatures which may be ranged between 100 and 125 degrees centigrade until it has absorbed the required amount of chlorin, such a process, for example, being described and claimed in my patent dated March 2, 1909, and numbered 914,223. The determination as to the required amount of chlorin that may be absorbed by the naphthalene may be ascertained by weight or by noting the amount of hydrochloric acid evolved or by testing a sample from time to time. After the chlorination is completed to the desired stage, the product is distilled and the distillate boiled with a 10% solution of caustic soda or potash and washed free of alkali. After washing the with a 10% solution of caustic soda or potash above the boiling point of water or by filtration through a water-absorbing medium. The oil may then be exposed to cold sufficient to crystallize out any contained solid modifications of the chloronaphthalene or higher substitution products thereof or free naphthalene, and the solid crystals may then be separated by filtration. The oil thus produced has a high specific gravity, much higher, in fact, than water; is not easily inflammable; is non-hygroscopic; is very mobile, and remains liquid at 15 degrees below zero centigrade; it has high dielectric strength and great penetrating power. I have found that this oil dissipates heat rapidly, due, presumably, to its low viscosity, which allows the rapid flow of convection currents. The high specific gravity is of decided advantage because if by any chance water should gain access to the container of the apparatus submerged in the oil the water floats on top and is excluded from the coils. With the oils now in use for insulating purposes such protection is not afforded. When a higher viscosity is desired the oil may be thickened by dissolving therein by the aid of heat from 2% to 5% of rubber or other gum.

It is sometimes advantageous to dissolve in the oil an organic anhydrid having the function of combining with traces of water if they should develop in the coils from imperfect drying of the same. Such anhydrids, which of themselves are good insulators and whose hydrolyzed products are also good insulators, are the anhydrids of the higher members of the fatty acids, such as stearic acid and palmitic acid.

Having now described my invention, what I claim as new therein and desire to secure by Letters Patent is as follows:—

1. A liquid insulator into which electrical apparatus may be submerged, consisting of a distilled chloro-naphthalene treated with an alkali, substantially as described.

2. A liquid insulator into which electrical apparatus may be submerged, consisting of a distilled chloro-naphthalene treated with an alkali and from which traces of free alkali are removed, substantially as described.

3. A liquid insulator into which electrical apparatus may be submerged, comprising a chlorinated naphthalene from which solid modifications of the same or higher substitution products or free naphthalene are removed, substantially as described.

4. A liquid insulating composition, comprising a distilled mono-chloro-naphthalene containing substantially no water, free naphthalene, or higher substitution products thereof, substantially as described.

5. An insulating composition containing liquid chlorinated naphthalene having an anhydrid dissolved therein, substantially as set forth.

6. An insulating composition containing liquid chlorinated naphthalene and an anhydrid of a higher member of a fatty acid, substantially as set forth.

7. An insulating composition containing liquid chlorinated naphthalene having dissolved therein a small percentage of gum and an anhydrid, substantially as set forth.

8. An insulating composition containing liquid chlorinated naphthalene having dissolved therein a small percentage of rubber and an anhydrid, substantially as set forth.

9. An insulating composition containing liquid chlorinated naphthalene having dissolved therein a small percentage of gum and an anhydrid of a higher member of a fatty acid, substantially as set forth.

10. An insulating composition containing liquid chlorinated naphthalene having dissolved therein a small percentage of rubber and an anhydrid of a higher member of a fatty acid, substantially as set forth.

This specification signed and witnessed this 10th day of March 1911.

JONAS W. AYLSWORTH.

Witnesses:
ANNA R. KLEHM,
CLARENCE CHURCHILL.

---

It is hereby certified that in Letters Patent No. 1,094,829, granted April 28, 1914, upon the application of Jonas W. Aylsworth, of East Orange, New Jersey, for an improvement in "Electrical Insulators," an error appears in the printed specification requiring correction as follows: Page 1, strike out line 71 and insert the words *oil may be freed from water by heating;* and that the said Letters Patent should be read with this correction therein that the same may conform to the record of the case in the Patent Office.

Signed and sealed this 26th day of May, A. D., 1914.

[SEAL.]

R. F. WHITEHEAD,
*Acting Commissioner of Patents.*